Apr. 3, 1923.

W. S. McKENZIE ET AL 1,450,324

LIGHTING ACCESSORY FOR AUTOMOBILES

Filed Nov. 28, 1921.

INVENTORS
WILLIAM S. McKENZIE.
ROBERT RICHARDSON

BY Fetherstonhaugh Co
ATTYS.

Patented Apr. 3, 1923.

1,450,324

UNITED STATES PATENT OFFICE.

WILLIAM STUART McKENZIE, OF CREIGHTON MINE, AND ROBERT RICHARDSON, OF COPPER CLIFF, ONTARIO, CANADA.

LIGHTING ACCESSORY FOR AUTOMOBILES.

Application filed November 28, 1921. Serial No. 518,394.

*To all whom it may concern:*

Be it known that we, WILLIAM STUART MCKENZIE and ROBERT RICHARDSON, both subjects of the King of Great Britain, and residents of Creighton Mine and Copper Cliff, respectively, in the Province of Ontario, Dominion of Canada, have invented certain new and useful Improvements in Lighting Accessories for Automobiles, of which the following is a specification.

This invention relates to improvements in lighting accessories for automobiles, and has for its objects to provide a ditch lamp.

Further objects are to provide a side illuminating means carried by the outer shell of the head light of the automobile, to provide a ditch light which consists of a bracket carried by the outer shell of the automobile head light and which pivotally carries a smaller light designed to be used at the same time, or independently of the head light.

Further objects are to provide a ditch lamp that is simple in construction, not liable to go out of repair, and generally to adapt the several parts to better perform the functions required of them.

With the above and other objects in view, the invention consists essentially of the improved construction, hereinafter described in detail in the accompanying specification and drawings.

In the drawings.

Like characters of reference indicate corresponding parts in all the figures.

Figure 1:
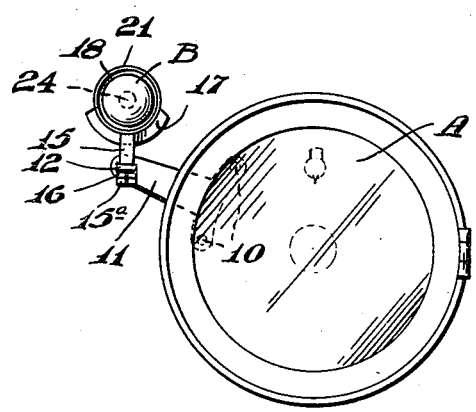
Figure 1 is a front elevation of an automobile light equipped with our improved ditch light.
Figure 2:
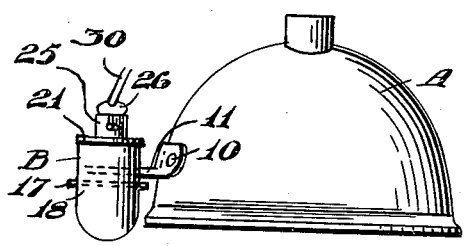
Figure 2 is a plan view of the same.
Figure 3:
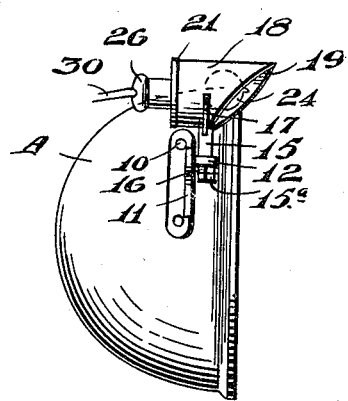
Figure 3 is a side elevation.
Figure 4:
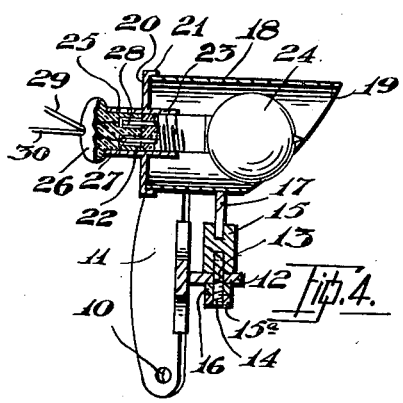
Figure 4 is a sectional detail taken through the ditch lamp.

Referring to the drawings, A represents the head light of an automobile of usual construction, and B the improved ditch light. Suitably fastened to the outer side of the head light shell as at 10 is a bracket 11 extending obliquely and upwardly and formed with a lug 12 extending forwardly.

The lug 12 is provided with a central orifice 13 through which extends a pin 14 screw threaded at its lower end and carried by a cylindrical member 15, which loosely rests upon the lug 12. The pin 14 is pivotally retained into the orifice 13 by means of a nut 15$^a$ engaging the threaded lower end of the pin 14 and bearing against the washer 16.

The cylindrical member 15 rigidly carries a crescent-shaped support 17, which is connected to and supports the cylindrical shell 18 of the ditch light B.

The shell 18 has its forward end open at 19, and cut obliquely downward, so as to intercept the rays of the light carried inside of the shell and reflect them downwardly on to the side of the automobile.

The shell 18 would be formed with an integral rear end 20, but the end 20 is preferably formed in the shape of a cover provided with a lip 21 engaging the side walls of the cylindrical shell 18 and suitably soldered or otherwise fastened thereto.

The cover 20 is formed with a central orifice 22 and connected to the edge of the orifice 22 is a socket 23 threaded inwardly and designed to carry the threaded shank of an electric light 24.

The cover 20 is also provided on its outer face around the peripheral edge of a central orifice 22 with a socket 25 which is designed to engage a block 26 carrying the connections adapted to abut against terminals 27 and 28 protruding from the socket 23 into the socket 25.

From the switch plug or block 26 two wires 29 and 30 lead to a suitable source of power.

When a car is equipped with this improved ditch light, the bulb 24 may be lighted simultaneously with the bulbs carried by the head lights A, or the light B may be used independently of the lights A.

The shell 18 of the ditch light B is pivotally mounted onto the bracket 11 and the same will be turned to the right or left, as convenient in order to give the operator of the automobile a clear vision of the ditch or any object on the side of the road.

As many changes could be made in the above construction, and many apparently widely different embodiments of our invention, within the scope of the claims, constructed without departing from the spirit or scope thereof, it is intended that all matter contained in the accompanying specification and drawings shall be interpreted as illustrative and not in a limiting sense.

What we claim as our invention is:

1. A ditch light comprising, in combination with the headlight of an automobile, a T-shaped bracket fastened to the outer side of the head light shell, a lug extending from the bracket and provided with an orifice, a support formed with a cylindrical member carrying a threaded pin within the orifice, means to freely retain the pin within the orifice, a semicircular element on the cylindrical member, a shell mounted on the support provided with a socket, a light in the socket, and wire connections to the socket.

2. A ditch light comprising, in combination with the headlight of an automobile, a bracket fastened to the outer side of the headlight shell, a lug extending from the bracket and provided with an orifice, a support formed with a cylindrical member carrying a threaded pin designed to loosely extend through the orifice, means to freely retain the pin within the orifice, a cylindrical shell mounted on the support, a flanged cover on one end of the shell formed with a socket, a light in the socket, and wire connections to the socket.

In witness whereof we have hereunto set our hands in the presence of two witnesses.

WILLIAM STUART McKENZIE.
ROBERT RICHARDSON.

Witnesses:
   G. M. MILLER,
   L. ALITALO.